WALTER K. JEKAT
INVENTOR.

United States Patent Office 2,921,804
Patented Jan. 19, 1960

2,921,804

DEFROSTING MEANS FOR TURBO-EXPANDERS

Walter K. Jekat, West Orange, N.J., assignor to Worthington Corporation, Harrison, N.J., a corporation of Delaware Application April 23, 1957, Serial No. 654,475

8 Claims. (Cl. 286—9)

This invention relates to turbo-expanders which are essentially rotating machines used to reduce gas temperatures.

Generally these turbo-expanders consist of a process portion, usually at extremely low temperatures, and bearing support portions segregated from the process portion and usually at ambient temperatures or thereabout.

The process portion includes, a main housing having insulation thereabout, a rotatable shaft having a turbine wheel mounted thereon, and seal means between the shaft and the main housing for preventing the leakage of process gas therebetween.

Process gas being chilled by the turbo-expander is an extremely valuable commodity, as a consequence the shaft must be provided with seal means that substantially preclude the loss of process gas between the said shaft and the main housing.

Seal means having the foregoing qualifications are generally provided with passageways for receiving a pressurized dry gas which dry gas creates a pressure barrier for preventing the escape of process gas from the process portion of the turbo-expander.

The segregated bearing support portions include bearing housings having bearings therein for accommodating each of the ends of the rotatable shaft extending through the main housing.

Segregation of the bearing portions from the process portion is of the essence, not only to provide for bearing operation at near ambient temperatures but also to prevent excessive heat leakage from the bearings to the process portion of the turbo-expander.

The pressurized dry gas temperature is normally below ambient temperature when leaving the seal. Consequently, it is imperative that exit means be provided for the dry gas, which exit means divert the gas to atmosphere and also minimize contact of the chilled dry gas with the bearings.

In operation, humid air or other gases containing moisture circulate in the vicinity of the foregoing exit means. Contact with the pressurized dry gas causes the moisture to freeze and rapidly block the exit means. The dry gas is then directed toward the bearings causing damage thereto as a consequence of the low temperature transmitted to these bearings by the pressurized dry gas.

In addition, moist air or the like circulates around the shaft or the bearing supports, which moisture freezes to thereby increase the cross-sectional area of the shaft and bearing supports to permit an increase in heat flow from the bearings to the process portion, which heat flow reacts to diminish the overall process efficiency of the turbo-expander.

Accordingly, it is an object of this invention to provide defroster means for a turbo-expander, which will minimize the formation of frost on the foregoing critical areas.

It is another object of this invention to substantially minimize the heat leakage from the bearing portion of the turbo-expander to the process portion thereof to thereby increase the overall process efficiency.

It will be noted that the foregoing described increase in heat flow will occur, in machines not provided with fluid seals, as a consequence of the extremely low operating temperatures of a turbo-expander, and it is not intended to thereby limit the invention to the specific construction shown and accordingly with the above objects in view and others that may appear from the accompanying specification, the invention consists of various features of construction and combination of parts, which will be first described in connection with the accompanying drawings, wherein.

Figures 1, 2, 3, 4:
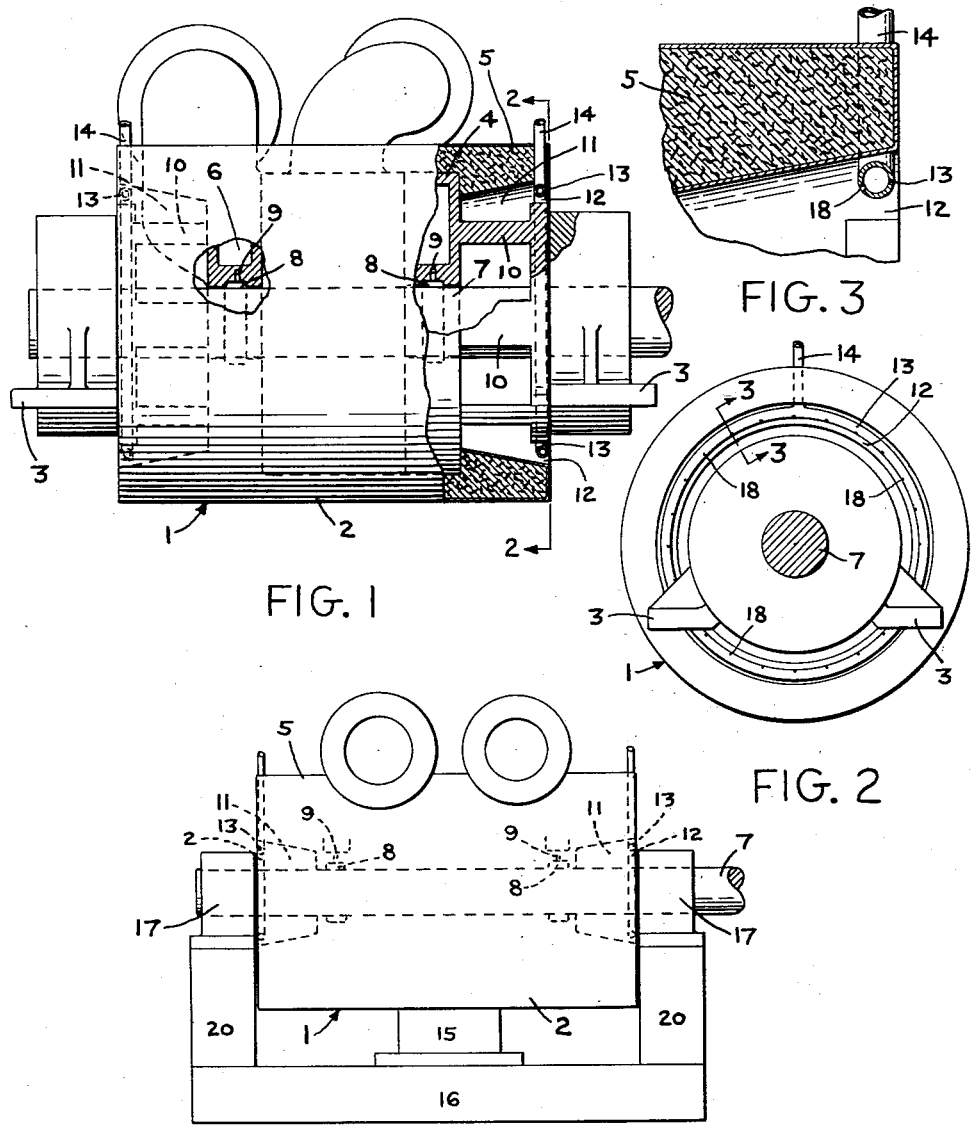
Figure 1 shows a turbo-expander, partly in section, and provided with the defroster means.
Figure 2 is a cross-section of the turbo-expander taken on lines 2—2 of Figure 1.
Figure 3 is an exploded fragmentary section taken on line 3—3 of Figure 2 showing the defroster means.
Figure 4 is a modified form of turbo-expander provided with the defroster means.

Referring to the drawings, the turbo-expander generally designated 1 has a process portion 2 and bearing support portions 3.

The process portion 2 includes a main housing 4 having the usual insulation 5 disposed thereabout.

The insulation 5 consisting of a material well known in the art is fastened to the main housing 4 by any one of a number of methods known to the technician skilled in the art of turbo-expanders.

Main housing 4 has the usual chamber 6 therein for accommodating a rotatable shaft 7 which shaft extends outwardly from the main housing 4 and is provided with the usual turbine wheel, not shown, for expanding one of a variety of process gases.

It is imperative that the process gas does not escape from the main housing 4. Accordingly, seal means 8 having a pressurized dry gas flowing therethrough are mounted in the main housing 4 in juxtaposition with shaft 7 as is shown in Figure 1 of the drawings to substantially preclude leakage therebetween.

The seal means 8 are well known in the art and are usually provided with passageways 9 formed in main housing 4 through which flows a pressurized dry gas from any convenient source and for this reason not shown.

The bearing support portion 3 adapted to accommodate bearings therein is usually segregated from the process portion 2, segregation being provided to insure operation of the bearings at efficacious temperatures and still preclude substantial heat leakage therefrom to the extremely cold process portion 2 of the turbo-expander 1.

Accordingly, the bearing support portion 3 is preferably connected to the main housing 4 by a plurality of circumferentially spaced ribs 10 of small cross-sectional area to preclude excessive heat leakage therethrough.

The ribs 10 connect the bearing support portions 3 and the bearing housing to the process portion 2 by any well known method of construction.

The insulation 5 for the process portion is further characterized as being disposed about the main housing 4 and extending outwardly therefrom to a vertical plane formed from the inboard sides of the bearing supports 3.

It will be noted that mounting of the insulation 5 in the foregoing manner will result in the formation of a defrosting cavity 11, which defrosting cavity receives at one end the pressurized dry gas flowing from the seal means 8 and at the other end provides an exit 12 for the pressurized dry gas flowing through the seal means 8. The exit 12 being so located to divert the flow of the pressurized dry gas to atmosphere to thereby preclude contact of the chilled pressurized dry gas with the bearings housed in the bearing support 3. The pressurized dry gas being chilled because of its proximity with the process gas having its temperature reduced.

An annular defroster conduit 13 having a plurality of apertures 18 therein is disposed in the exit means 12 which defroster conduit is supplied with a dry defrosting gas from any suitable source through receiving tube 14. The dry defrosting gas being introduced at a predetermined pressure to prevent the circulation of air or other humid gases in the vicinity of the exit 12 and further providing a curtain about the exit to prevent the passage of the humid gases therethrough.

It is self-evident that exclusion of moist gases from the vicinity of the exit 12 will preclude the formation of frost therein, which frost functions to divert the chilled pressurized dry gas, coacting with the seal means 8, to the bearings housed in the bearing supports 3 causing injury thereto.

Accordingly, continuous flow through said exit 12 is provided for the chilled gas to substantially minimize the adverse effects imparted to the bearings during contact therewith.

Some turbo-expanders due to operating requirements utilize the usual seal means 8 not provided with the coacting pressurized dry gas for preventing leakage of the process gas.

In machines of this type it is still advantageous to utilize applicant's novel defroster means to preclude the formation of frost on the shaft 7 and ribs 10 housed in the defroster cavity 11. Frost forms on these members because of their closeness with the process portion 2 of the turbo-expander 1.

It will be noted that the curtain provided by the dry defrosting gas conducted through defroster conduit 13 disposed about exit 12 precludes the entry of humid gases into the defroster cavity 11 to thereby prevent formation of frost on the ribs 10 and the shaft 7.

Minimizing formation of frost on the foregoing members insures the maintaining of the requisite constant cross-sectional areas of the ribs 10 and the shaft 7 which in effect reduces the heat leakage from the bearing to the process portion 2 to that leakage established during design of the turbo-expander.

The turbo-expander 1 shown in Figure 4 differs in some degree from the preferred form of turbo-expander shown in Figure 1. However, the principles of operation and the general principles of control for the defroster means are substantially identical.

The modified turbo-expander changes in particular the arrangement of the bearing support portions 3 wherein support for the bearings is provided for by vertical members 20 and support for the turbine is provided for by support member 15. Support member 15 and vertical members 20 have a common bedplate 16 for holding the turbo-expander in spaced relation between said vertical members.

A like defroster cavity 11 is formed by the insulation 5; the exit 12 of the said cavity also being provided with a defroster conduit 12 to prevent frost formation in the exit means 12 which frost diverts the gas to the bearing 17 supported by vertical members 29.

The shaft 7 is the only member wherein heat leakage from the bearings 17 to the process portion 2 is permitted since support for the bearings is achieved through the vertical members 20 rather than through utilization of ribs 10 as is shown for the turbo-expander of Figure 1.

It will be understood that the invention is not to be limited to the specific construction or arrangement of parts shown, but that these may be widely modified within the invention defined by the claims.

What is claimed is:

1. A turbo-expander for reducing temperature of process gas comprising, a main housing having a rotatable shaft therethrough, seal means between said main housing and said shaft, passage means in said main housing opening in said seal means for flowing pressurized dry gas through said seal means to prevent leakage of said process gas from said main housing, insulating material about said main housing and extending beyond the ends thereof, a cavity formed by said main housing and said insulating material, said cavity communicating with said seal means at one end and providing exit means at the other end for discharging said pressurized dry gas, conduit means opening in said cavity for providing a dry defrosting gas curtain adjacent said exit means whereby said dry defrosting gas cooperates with said insulating material to provide continuous flow through said exit means.

2. A turbo-expander for reducing temperature of process gas comprising, a main housing having a rotatable shaft therethrough, seal means between said main housing and said shaft, passage means in said main housing opening on said seal for flowing pressurized dry gas through said seal means to prevent leakage of said process gas from said main housing, insulating material about said main housing extending beyond the end of said main housing, a cavity formed by said main housing and said insulating material, said cavity communicating with said seal means at one end for receiving said pressurized dry gas and providing exit means at the other end for discharging said pressurized dry gas, conduit means opening in said cavity substantially adjacent said exit means adapted to provide a dry defrosting gas curtain adjacent said exit means whereby said dry defrosting gas cooperates with said insulating material to provide continuous flow of said pressurized dry gas through said exit means.

3. A turbo-expander for reducing temperature of process gas comprising, a main housing having a rotatable shaft therethrough, seal means between said main housing and said shaft, insulating material about said main housing extending beyond the end thereof, a cavity formed from said main housing and said insulating material, and conduit means opening in said cavity for providing a dry defrosting gas curtain for said cavity to prevent the formation of frost in said cavity.

4. A turbo-expander for reducing temperature of process gas comprising, a main housing having a rotatable shaft therethrough, seal means between said main housing and said shaft, insulating material about said main housing extending beyond the end thereof, a cavity formed from said main housing and said insulating material, and conduit means opening substantially adjacent the open end of said cavity for providing a dry defrosting gas curtain for said cavity to prevent the formation of frost in said cavity.

5. A turbo-expander for reducing temperature of process gas comprising, a main housing having a rotatable shaft therethrough, seal means between said main housing and said shaft, passage means in said main housing opening on said seal means for flowing pressurized gas through said seal means to prevent leakage of said process gas from the main housing, bearing means for said shaft a predetermined spaced distance from the outboard side of said seal means, rib means connected between said bearing means and said main housing radially of said seal means, insulating material about said main housing and extending beyond the end of said housing, said main housing and insulating material forming a cavity about the rib means adjacent said seal means, said seal means communicating with the cavity to pass pressurized gas thereto, said insulating means disposed relative the rib means to form an outlet for said cavity for discharging pressurized gas, and means in said cavity to provide a dry defrosting gas curtain for said cavity to prevent the formation of frost therein and to insure continuous discharge of pressurized gas through said outlet.

6. A turbo-expander as claimed in claim 5 wherein said defrosting means is disposed substantially adjacent the outlet means for the cavity.

7. A turbo-expander for reducing temperature of process gas comprising, a main housing having a rotatable shaft therethrough, seal means between said main housing and said shaft, passage means in said main housing opening on said seal means for flowing pressurized gas through said seal means to prevent leakage of said process gas from the main housing, bearing means for said shaft a predetermined spaced distance from the outboard side of said seal means, rib means connected between said bearing means and said main housing radially of said seal means, insulating material about said main housing and extending beyond the end of said housing to a point in a plane with the outboard end of said rib means, said main housing and said insulating material forming a cavity about the rib means and adjacent the seal means, said seal means in communication with the cavity to pass pressurized gas thereto, said insulating material disposed relative the rib means to provide an outlet for the cavity radially of the bearing means for discharging pressurized gas, and conduit means in said cavity to pass a dry defrosting gas thereto to prevent the formation of frost in said cavity and to insure continuous flow of pressurized gas from the outlet for the cavity.

8. In a turbo-expander as claimed in claim 7 wherein said conduit means is disposed substantially adjacent the outlet means for the cavity.

References Cited in the file of this patent

UNITED STATES PATENTS

| | | |
|---|---|---|
| 2,165,994 | Zerkowitz | July 11, 1939 |
| 2,299,119 | Yeomans | Oct. 20, 1942 |
| 2,529,880 | McClure | Nov. 14, 1950 |
| 2,554,234 | Baudry | May 22, 1951 |
| 2,748,574 | Gaston | June 5, 1956 |